(12) United States Patent  
Smith

(10) Patent No.: US 6,333,693 B1  
(45) Date of Patent: Dec. 25, 2001

(54) WIRELESS COMMUNICATION PACKAGES, A RADIO FREQUENCY IDENTIFICATION DEVICE COMMUNICATION PACKAGE, AN APPENDAGE, A METHOD OF COMMUNICATING, AND A METHOD OF FORMING A WIRELESS COMMUNICATION PACKAGE

(75) Inventor: Freddie W. Smith, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/660,537

(22) Filed: Sep. 13, 2000

Related U.S. Application Data

(63) Continuation of application No. 09/032,737, filed on Feb. 27, 1998, now Pat. No. 6,133,836.

(51) Int. Cl.$^7$ .................................................. G08B 13/14
(52) U.S. Cl. .................................. 340/572.7; 340/572.8; 343/700 MS; 455/90
(58) Field of Search ............................. 340/572.7, 572.8, 340/572.1, 10.1, 505; 343/700 MS; 342/51; 455/128, 129, 347, 351, 550, 575, 90

(56) References Cited

U.S. PATENT DOCUMENTS

| | | | |
|---|---|---|---|
| 4,075,632 | 2/1978 | Baldwin et al. | 342/51 |
| 4,709,201 | * 11/1987 | Schaefer et al. | 455/90 X |
| 4,857,893 | * 8/1989 | Carroll | 340/572.7 |
| 4,926,182 | 5/1990 | Ohta et al. | 342/44 |
| 5,061,943 | 10/1991 | Rammos | 343/770 |
| 5,138,651 | * 8/1992 | Sudo | 455/90 X |
| 5,151,946 | * 9/1992 | Marteisson | 455/550 |
| 5,170,173 | * 12/1992 | Krenz et al. | 343/702 |
| 5,392,049 | 2/1995 | Gunnarsson | 342/51 X |
| 5,400,039 | 3/1995 | Araki et al. | 343/700 MS |
| 5,410,749 | 4/1995 | Siwiak et al. | 343/700 MS |
| 5,442,367 | 8/1995 | Naito et al. | 343/700 MS |
| 5,621,412 | 4/1997 | Sharpe et al. | 342/51 |
| 5,642,103 | * 6/1997 | Tokuda et al. | 340/10.51 |
| 5,649,295 | 7/1997 | Shober | 342/51 |
| 5,649,296 | 7/1997 | MacLellan et al. | 455/38.2 |
| 5,939,984 | 8/1999 | Brady et al. | 340/572.1 |
| 6,118,379 | * 9/2000 | Kodukula et al. | 340/572.8 |
| 6,133,836 | 10/2000 | Smith | 340/572.7 |

OTHER PUBLICATIONS

U. S. application No. 08/926,595,Tuttle, filed on Aug. 20, 1997.
U. S. application No. 09/032,737, Smith, filed on Feb. 27, 1998.
U. S. application No. 08/914,305, Dando, filed on Aug. 18, 1997.
Kraus, John D., Antennas Second Edition, McGraw–Hill, Inc. New York, 1988, pp. 460–477 and 716–725.
U. S. application No. 09/570,365, Dando, filed on Apr. 13, 2000.

* cited by examiner

*Primary Examiner*—Thomas Mullen
(74) *Attorney, Agent, or Firm*—Wells, St. John, Roberts, Gregory & Matkin, P.S.

(57) ABSTRACT

The present invention provides wireless communication and identification packages, communication systems, methods of identifying an identification device, methods of communicating, and methods of forming a communication device. In one aspect of the present invention, a wireless communication package includes a communication device having a substrate; communication circuitry borne by the substrate, the communication circuitry being configured to at least one of process and form wireless communication signals; and at least one antenna electrically coupled with the communication circuitry, the antenna being configured to at least one of receive wireless communication signals and output wireless communication signals; and an appendage coupled with the communication device, the appendage being configured to enhance at least one of receiving and outputting of wireless communication signals via the antenna.

47 Claims, 4 Drawing Sheets

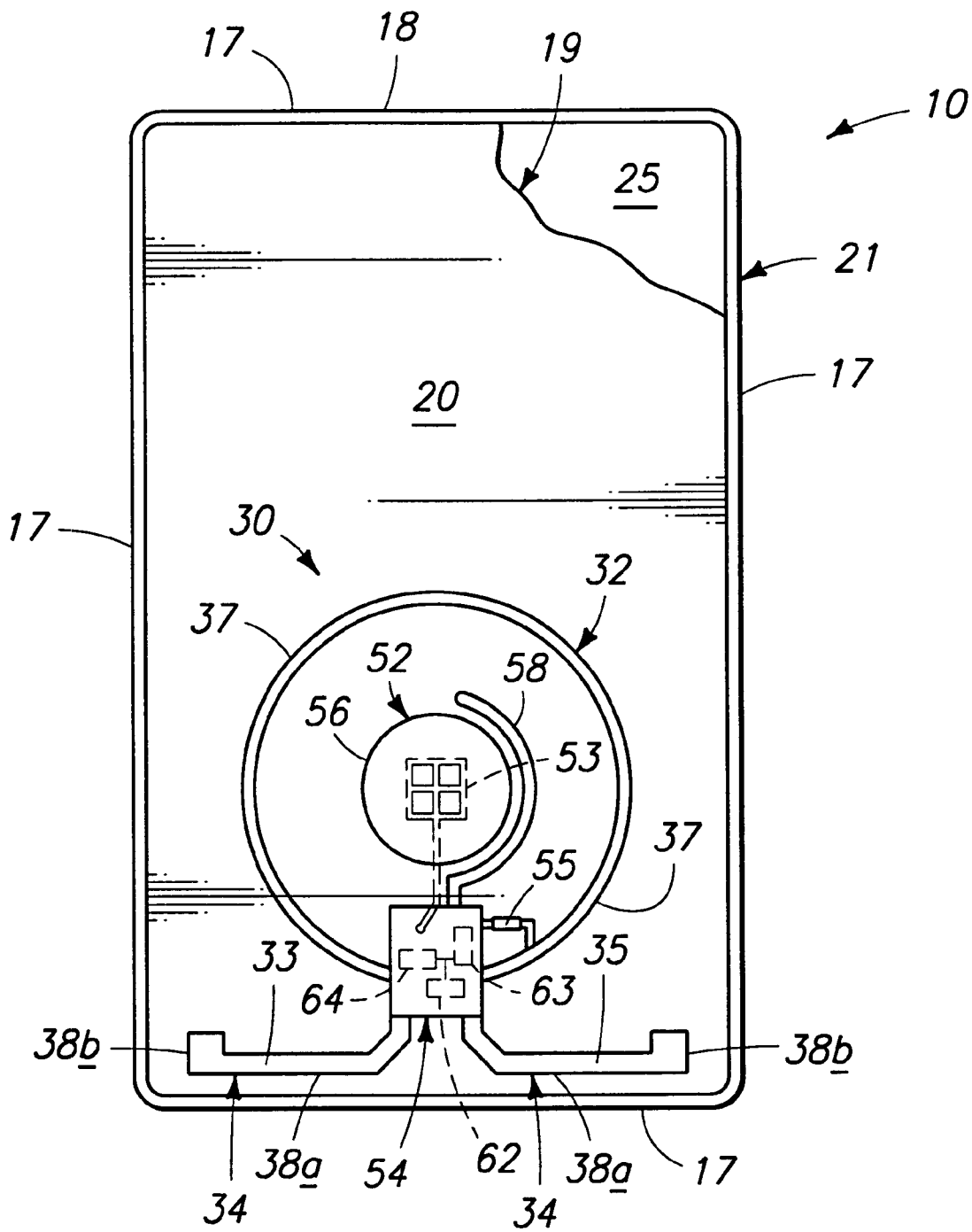

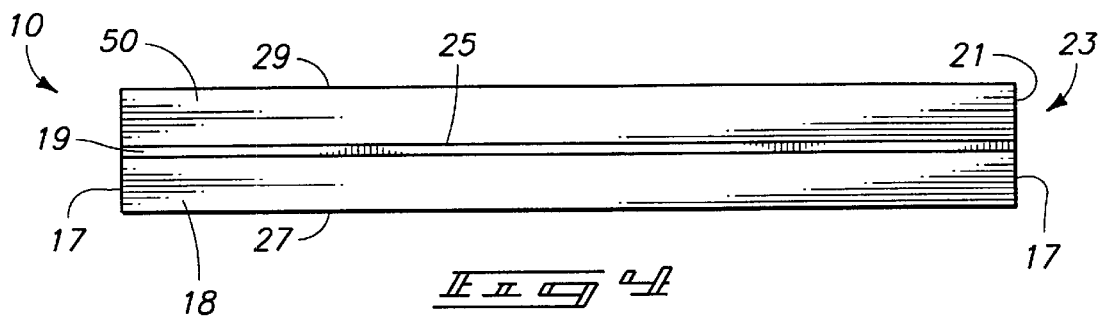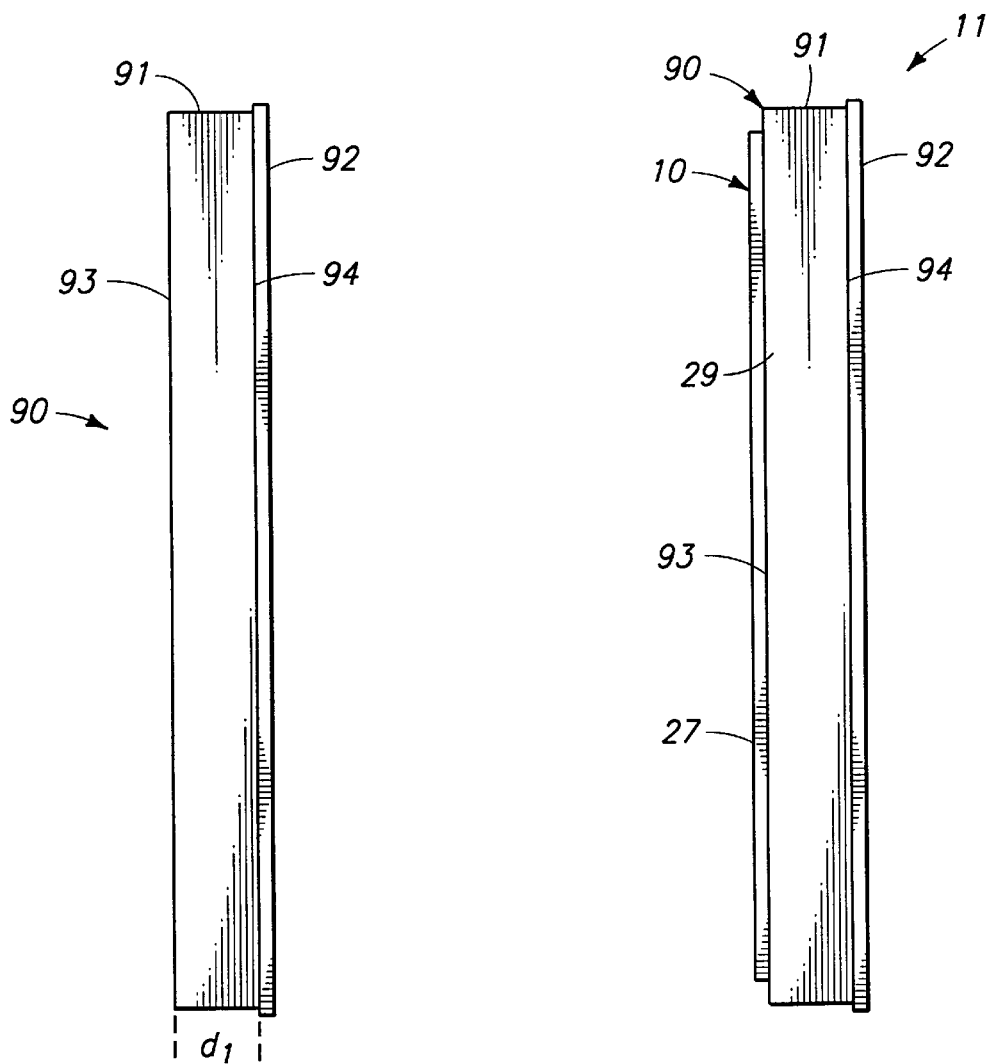

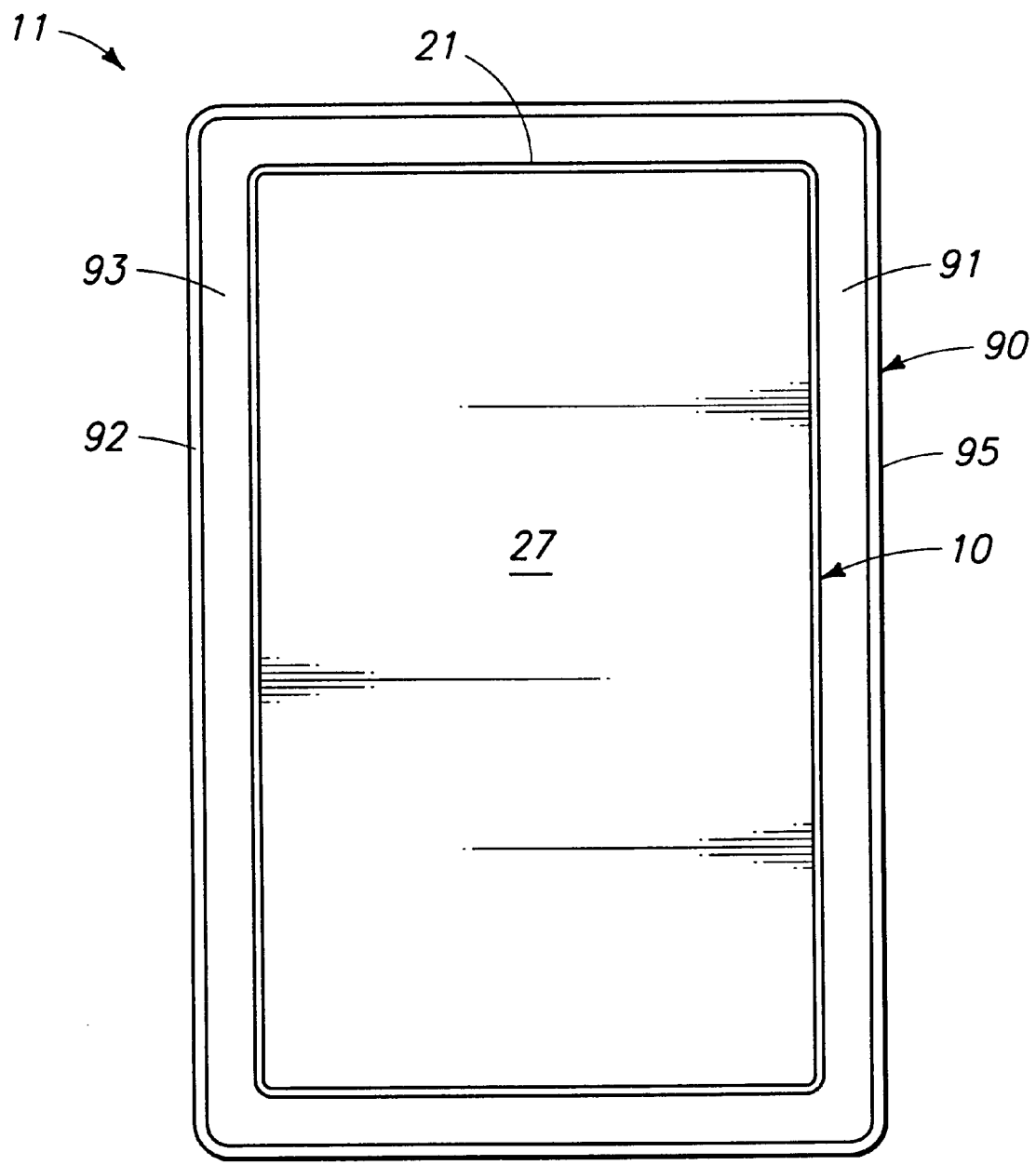

WIRELESS COMMUNICATION PACKAGES, A RADIO FREQUENCY IDENTIFICATION DEVICE COMMUNICATION PACKAGE, AN APPENDAGE, A METHOD OF COMMUNICATING, AND A METHOD OF FORMING A WIRELESS COMMUNICATION PACKAGE

This patent resulted from a continuation application of prior application Ser. No. 09/032,737, filed on Feb. 27, 1998, now U.S. Pat. No. 6,133,836, issued Oct. 17, 2000, entitled "Wireless Communication and Identification Packages, Communication Systems, Methods of Communicating, and Methods Forming A Communication Device"; by the following named inventor: Freddie W. Smith; the disclosure of which is all incorporated herein by reference.

TECHNICAL FIELD

The present invention relates to wireless communication and identification packages, communication systems, methods of communicating, and methods of forming a communication device.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, now U.S. Pat. No. 6,130,602, issued Oct. 10, 2000, assigned to the assignee of the present application and incorporated herein by reference. This application discloses the use of a radio frequency (RF) communication system including communication devices. The disclosed communication devices include an interrogator and a transponder, such as a tag or card.

Such communication systems can be used in various identification functions and other applications. The interrogator is configured to output a polling or interrogation signal which may comprise a radio frequency signal including a predefined code. The transponders of such a communication system are operable to transmit an identification signal responsive to receiving an appropriate polling or interrogation signal. More specifically, the appropriate transponders are configured to recognize the predefined code. The transponders receiving the code subsequently output a particular identification signal which is associated with the transmitting transponder. Following transmission of the polling signal, the interrogator is configured to receive identification signals enabling detection of the presence of corresponding transponders.

Such communication systems are useable in identification applications such as inventory or other object monitoring. For example, a remote identification device is attached to an object of interest. Responsive to receiving the appropriate polling signal, the identification device is equipped to output an identification signal. Generating the identification signal identifies the presence or location of the identification device and the article or object attached thereto.

It is preferred in most applications to maximize the communications range of the identification devices. Enabling is communications at increased distances or ranges increases the number of applications for which the identification system may be utilized. Further, expanding the range of communications provides robust communications at decreased ranges.

SUMMARY OF THE INVENTION

In one aspect of the present invention, a wireless communication package is provided. The wireless communication package comprises a communication device and an appendage. The communication device includes a substrate and communication circuitry borne by the substrate. The communication circuitry is configured to at least one of process and form wireless communication signals. At least one antenna is electrically coupled with the communication circuitry and is configured to at least one of receive wireless communication signals and output wireless communication signals. The appendage is coupled with the communication device and is configured to enhance at least one of receiving and outputting of wireless communication signals via the antenna.

Another aspect of the invention provides a wireless identification package. The wireless identification package includes a housing and at least one antenna borne by the housing. The antenna is configured to at least one of receive wireless interrogation signals and output wireless identification signals. Communication circuitry is electrically coupled with the antenna and is configured to process received wireless interrogation signals and form wireless identification signals. An appendage is coupled with a surface of the housing. The appendage is configured to enhance at least one of receiving wireless interrogation signals and outputting wireless identification signals.

A communication system is provided in another aspect of the invention. The communication system includes an interrogator configured to output and receive wireless communication signals and a wireless communication package configured to communicate with the interrogator. The wireless communication package includes a communication device and an appendage configured to enhance wireless communications of the communication device.

The present invention also provides methods of communicating. Methods according to one aspect include steps of coupling an appendage with the identification device and increasing radio frequency energy of a wireless interrogation signal at the antenna using the appendage.

Methods of forming a wireless communication package are disclosed in another aspect of the invention. The methods of forming include steps of forming a housing and coupling an appendage configured to enhance wireless communications with the housing.

BRIEF DESCRIPTION OF THE DRAWINGS

Preferred embodiments of the invention are described below with reference to the following accompanying drawings.

FIG. 3 is a top plan view of the communication device at an intermediate processing step.

FIG. 4 is an elevated end view of the communication device.

FIG. 5 is an elevated side view of an appendage according to the present invention.

FIG. 6 is an elevated side view of a communication package of the present invention.

FIG. 7 is a top plan view of the communication package.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

This description of the present invention discloses embodiments of various wireless communication devices including wireless identification devices. The wireless communication devices are fabricated in card configurations (which include tags or stamps) according to first and second aspects of the present invention. Preferred communication devices of the described communication system are provided in housings. Different housings are utilized in different embodiments. An encapsulant forms a portion of the housing of the communication device described herein. Alternatively, a plastic shell or similar such housing is utilized.

The embodiments -are illustrative and other configurations of wireless communication devices according to the present invention are possible. Certain embodiments of the wireless communication devices according to the invention comprise radio frequency identification devices (RFID) and remote intelligent communication devices (RIC). Remote intelligent communication devices are capable of functions other than the identifying function of radio frequency identification devices. A preferred embodiment of the remote intelligent communication device includes a processor.

Figure 1:
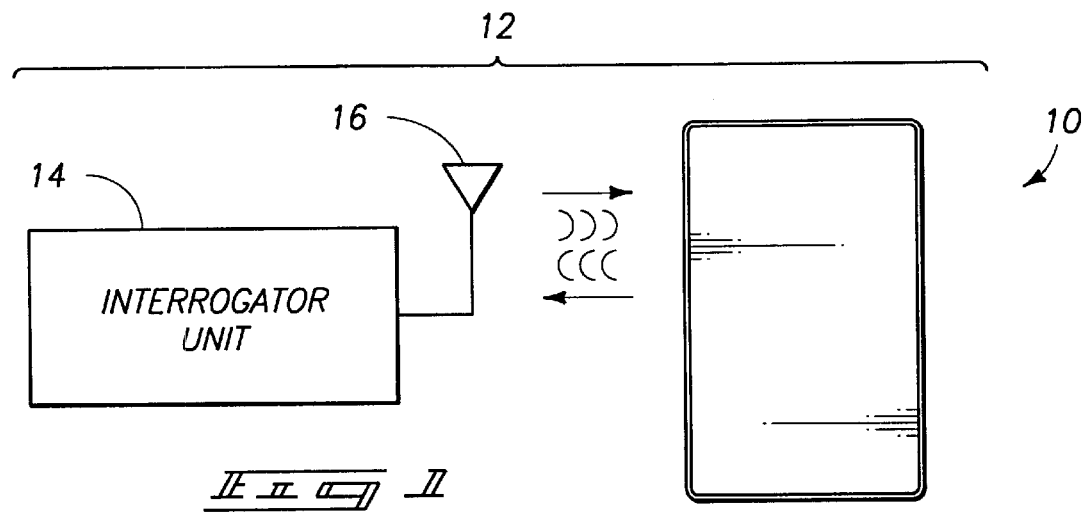
FIG. 1 is a diagrammatic representation of a communication system of the present invention.

Referring to FIG. 1, a wireless communication device 10 comprises part of a communication system 12. An exemplary communication system 12 is described in U.S. patent application Ser. No. 08/705,043, filed Aug. 29, 1996, now U.S. Pat. No. 6,130,602, issued Oct. 10, 2000, assigned to the assignee of the present application and incorporated herein by reference. Communication system 12 further includes an interrogator unit 14. An exemplary interrogator 14 is described in detail in U.S. patent application Ser. No. 08/806,158, filed Feb. 25, 1997, now abandoned, assigned to the assignee of the present application and incorporated herein by reference.

Wireless communication device 10 communicates via wireless communication signals, such as radio frequency (RF) signals, with the interrogator unit 14. The wireless communication signals include wireless interrogation signals and wireless identification signals. Radio frequency signals including microwave signals are utilized for communications in a preferred embodiment of-communication system 12. The communication system 12 includes an antenna 16 coupled to the interrogator unit 14.

Figure 2:
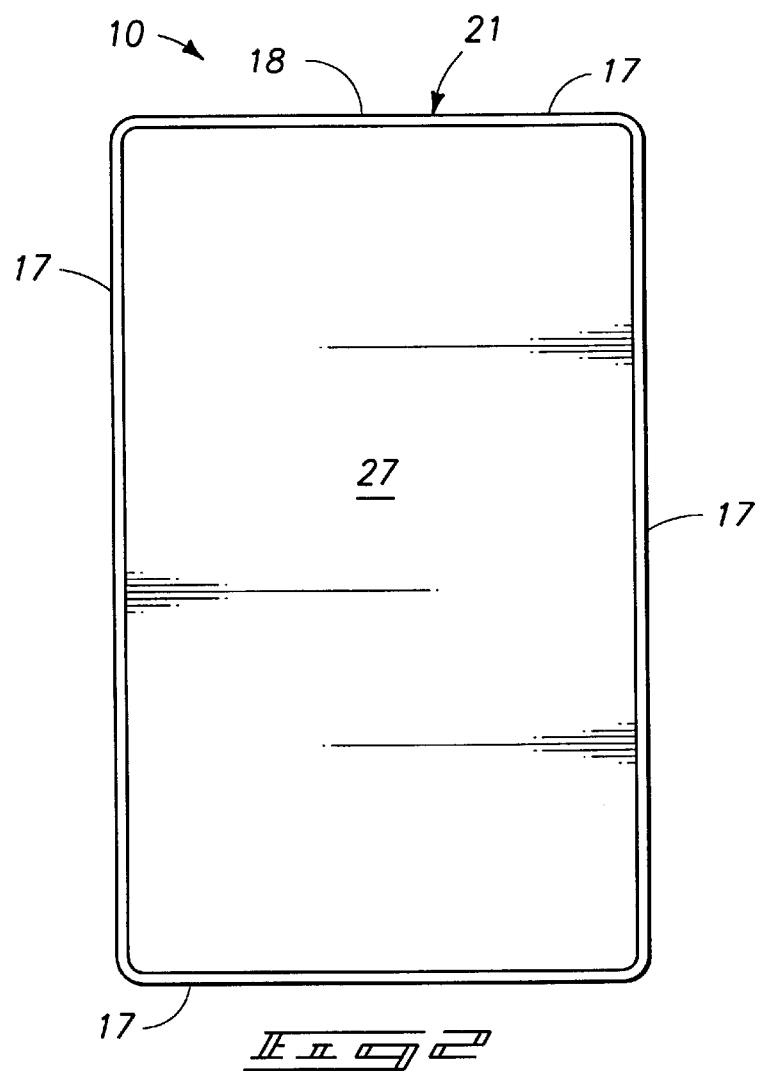
FIG. 2 is a top plan view of a communication device of the communication system.

Referring to FIG. 2, wireless communication device 10 includes an insulative substrate or layer of supportive material 18. The term "substrate" as used herein refers to any supporting or supportive structure, including but not limited to, a supportive single layer of material or multiple layer constructions. Example materials for the substrate 18 comprise polyester, polyethylene or polyimide film having a thickness of 4–6 mils (thousandths of an inch). Substrate 18 la comprises a printed circuit board (PCB) in other embodiments of communication device 10.

In one embodiment, substrate 18 provides a first or lower portion of a housing for the wireless communication device 10 and defines an outer periphery 21 of the device 10. Periphery 21 of substrate 18 includes a plurality of peripheral edges 17. A first surface 27 of wireless communication device 10 is shown in FIG. 2. Communication device 10 also includes a second surface 29 (shown in FIG. 4) opposite first surface 27.

Referring to FIG. 3, substrate 18 includes a support surface 25. At least one ink layer 19 is applied to support surface 25 of substrate 18 in a preferred embodiment of the invention. Ink layer 19 enhances the appearance of device 10. Ink 19 also conceals internal components and circuitry provided therein because substrate 18 comprises a clear substrate in some embodiments. A portion of ink layer 19 has been peeled away in FIG. 3 to reveal a portion of first surface 25 of substrate 18. In other embodiments, plural ink layers are provided upon first surface 25 of substrate 18.

A support surface 20 is provided to support components and wireless communication circuitry formed in later processing steps upon substrate 18. In embodiments wherein at least one ink layer 19 is provided, support surface 20 comprises an upper surface of ink layer 19 as shown in FIG. 3. Alternatively, first surface 25 of substrate 18 operates as the support surface 20 if ink is not applied to substrate 18.

A patterned conductive trace 30 is formed or applied over the substrate 18 and atop the support surface 20. Conductive trace 30 is formed upon ink layer 19, if present, or upon substrate 18 if no ink layer is provided. A preferred conductive trace 30 comprises printed polymer thick film (PTF). A suitable polymer thick film is EMCA REMEX P2607. An exemplary thickness of the polymer thick film is approximately 1 mil. The printed thick film comprises silver and polyester dissolved into a solvent. One manner of forming or applying the conductive trace 30 is to screen or stencil print the film on the support surface 20 through conventional screen printing techniques. The conductive trace 30 forms desired electrical connections with and between electronic components described below.

The illustrated conductive trace 30 includes a connection terminal 53 (shown in phantom in FIG. 3) and a connection terminal 58. Conductive trace 30 additionally defines antennas 32, 34 in one embodiment of the invention. Antennas 32, 34 are suitable for respectively receiving and outputting wireless signals or radio frequency energy. Antennas 32, 34 are also referred to as forward link and return link antennas, respectively. In the described embodiment, forward link communication refer to the communication of a wireless interrogation signal from interrogator 14 to at least one communication device 10. Return link communications refer to the communication of a wireless identification signal from a communication device 10 to interrogator 14.

In the illustrated embodiment, antenna 32 is a loop antenna having outer peripheral edges 37. Antenna 34 is formed as a dipole antenna constituting two elongated halves or portions. 33, 35. Portions 33, 35 individually have horizontal peripheral edges 38a, which extend in opposing directions, and substantially parallel vertical peripheral edges 38b. Halves 33, 35 of antenna 34 have corresponding lengths appropriate for the desired transmission frequency. In the illustrated embodiment, halves 33, 35 of the dipole antenna 34 have respective sizes appropriate for 2.45 GHz communications. Both antennas 32, 34 including respective edges 37, 38 preferably extend or lie within the confines of peripheral edges 17 and outer periphery 21 of communication device 10.

Other antenna constructions are possible. In particular, both transmit and receive operations are implemented with a single antenna in alternative embodiments of the present invention.

One embodiment of wireless communication device 10 includes a power source 52, integrated circuit 54, and at least one capacitor 55. Power source 52, integrated circuit 54 and capacitor 55 are provided and mounted on support surface 20 and borne or supported by substrate 18 in the described embodiment. The depicted power source 52 is disposed within forward link antenna 32 of the illustrated wireless communication device 10. Capacitor 55 is electrically coupled with loop antenna 32 and integrated circuit 54 and assists with noise reduction in the described embodiment.

Power source 52 provides operational power to the wireless communication device 10 and selected components therein, including integrated circuit 54. In the illustrated embodiment, power source 52 comprises a battery. In particular, power source 52 is preferably a thin profile battery which includes first and second terminals of opposite polarity. More particularly, the battery has a lid or negative (i.e., ground) terminal or electrode, and a can or positive (i.e., power) terminal or electrode.

Conductive epoxy is applied over desired areas of support surface 20 using conventional printing techniques, such as stencil or screen printing, to assist in component attachment described below. Alternatively, solder or another conductive material is employed instead of conductive epoxy. Power source 52 is provided and mounted on support surface 20 using the conductive epoxy. Integrated circuit 54 and capacitor 55 are also provided and mounted or conductively bonded on the support surface 20 using the conductive epoxy. Integrated circuit 54 can be mounted either before or after the power source 52 is mounted on the support surface 20.

One embodiment of integrated circuit 54 includes suitable communication circuitry for providing wireless communications capabilities within electronic communication device 10. For example, in one embodiment, communication circuitry of integrated circuit 54 includes a microprocessor 62, memory 63, and transponder circuitry 64 (components 62, 63, 64 are shown in phantom in FIG. 3) in cooperation with one another for providing wireless communications with interrogator unit 14. An exemplary and preferred integrated circuit 54 is described in U.S. patent application Ser. No. 08/705,043, filed Aug. 29, 1996, now U.S. Pat. No. 6,130,602, issued Oct. 10, 2000, incorporated by reference above.

One embodiment of the communication circuitry including transponder circuitry 64 includes a modulator, such as a transmitter, and a receiver individually operable to respectively communicate (i.e., output) and receive wireless electronic signals. The microprocessor 62 is coupled with transponder circuitry 64 and is configured to process received forward link wireless communication signals. Responsive to the processing and detection of an appropriate polling signal within the forward link signals, microprocessor 62 forms a wireless identification return link signal. Microprocessor 62 instructs the modulator of transponder circuitry 64 to output the identification signal. The wireless communication signals are communicated via antennas 32, 34 in the illustrated embodiment.

The receiver of transponder circuitry 64 is configured to receive electromagnetic signals (e.g., in a wireless fashion) and the modulator is configured to output or communicate electromagnetic signals (e.g., in a wireless fashion). The modulator comprises either an active transmitter or a back-scatter device, or both, according to certain embodiments. Such outputting or communicating of the wireless signals via the modulator comprises one of transmitting wireless signals and reflecting received signals. Typically, the modulator is configured to communicate a wireless identification signal responsive to the reception of an appropriate wireless interrogation or polling wireless signal. The wireless identification signal outputted via the modulator identifies the particular device 10 communicating the identification signal in one embodiment.

Connection terminals 53, 58 are coupled to the integrated circuit 54 by conductive epoxy in accordance with a preferred embodiment of the invention. The conductive epoxy also electrically connects the first terminal of the power source 52 to the first connection terminal 53. In the illustrated embodiment, power source 52 is placed lid (i.e., negative terminal) down such that the conductive epoxy makes electrical contact between the negative terminal of power source 52 and first connection terminal 53.

Power source 52 has a perimetral edge 56, which defines the second power source terminal, and is provided adjacent second connection terminal 58. In the illustrated embodiment, perimetral edge 56 of the power source 52 is cylindrical and connection terminal 58 is arcuate. Connection terminal 58 has a radius slightly greater than the radius of the power source 52 so that connection terminal 58 is closely spaced apart from the edge 56 of power source 52. In the illustrated embodiment, perimetral edge 56 defines the can of the power source 52. Edge 56 forms the positive contact or terminal of power source 52.

Subsequently, conductive epoxy is dispensed relative to perimetral edge 56 and electrically connects perimetral edge 56 with. connection terminal 58. The conductive epoxy connects the positive terminal of the power source 52 to connection terminal 58. The conductive epoxy is then cured.

Referring to FIG. 4, an encapsulant 50, such as an encapsulating epoxy resin material, is subsequently formed to encapsulate a portion of the substrate 18. In one embodiment, resin encapsulant 50 is provided about and covers power source 52, integrated circuit 54 and conductive trace 30.

An exemplary resin encapsulant 50 is a flowable encapsulant. The flowable encapsulant 50 is flowed to encapsulate substrate 18. Encapsulant 50 is subsequently cured following the appropriate covering of power source 52, integrated circuit 54, conductive circuitry 30, and support surface 20 of substrate 18.

In the exemplary embodiment, such epoxy encapsulant 50 constitutes a two-part epoxy having a resin and a hardener which are sufficient to provide a desired degree of flexible rigidity. Further details regarding encapsulation of communication device 10 are described in U.S. patent application Ser. No. 08/800,037, filed Feb. 13, 1997, now U.S. Pat. No. 5,988,510, issued Nov. 23, 1999, assigned to the assignee of the present application, and incorporated herein by reference.

In the described embodiment, the encapsulant 50, when cured, forms a composite substrate or solid housing 23 of communication device 10 which includes substrate 18 and encapsulant 50. The housing comprises a separate structure or shell configured to enclose the internal components (antennas 32, 34, power source 52 and integrated circuit 54) in alternative embodiments. The housing may comprise plastic in such alternative embodiments.

Substrate 18 defines first surface 27 of communication device 10 and encapsulant 50 defines a second surface 29 of communication device 10. In one embodiment, housing 23 of communication device 10 has a length of about 3.375 inches, a width of about 2.125 inches, and a thickness less than or equal to about 0.009 inches.

Referring to FIG. 5, an embodiment of an appendage 90 according to the present invention is illustrated. Appendage 90 is configured to enhance wireless communications of communication device 10 and is also referred to as a wireless communication range enhancer or attachment. In particular, appendage 90 improves the range of wireless communications of communication device 10 with interrogator 14. In a preferred mode of operation, appendage 90 enhances wireless communications of communication device 10 by maximizing radio frequency energy at receive antenna 32 of device 10. Appendage 90 improves both forward link and return link wireless communications within communication system 12.

Utilization of appendage 90 improves the communications range of communication device 10 by approximately 70 percent. In an enhanced mode of operation, receive antenna 32 of communication device 10 has a gain of approximately 4–5 dB. When utilized in combination with appendage 90, receive antenna 32 has a gain of approximately 10–11 dB.

The illustrated appendage 90 includes a spacer 91 and conductive layer 92. Spacer 91 includes a first surface 93 and a second surface 94 opposite first surface 93. In one embodiment, spacer 91 comprises a material which does not absorb or reflect radio frequency energy within the communication band being utilized by communication system 12 (e.g., 915 MHz band or 2:45 GHz band in the described embodiment). Spacer 91 comprises STYROFOAM® available from the Dow Chemical Company in one embodiment. Spacer 91 is formed of other materials or polystyrenes in other embodiments.

Conductive layer 92 is configured in one embodiment to form a ground plane operable to reflect radio frequency energy and the wireless communication signals. Such reflection provides enhancement of the wireless communications of communications device 10. Both forward and return link communication signals are reflected by conductive layer 92 providing enhancement of both forward and return link communications.

A preferred conductive layer 92 comprises metal foil. The metal foil conductive layer 92 may comprise aluminum, gold, silver, copper or any other highly conductive metal. Conductive layer 92 comprises copper tape in the described embodiment. The copper tape has an adhesive side which is mounted to second surface 94 of spacer 91. Other adhesives are utilized to attach conductive layer 92 to spacer 91 to form appendage 90 in other embodiments.

Spacer 91 of the described appendage 90 has a predefined width $d_1$. Width $d_1$ is defined as the dimension intermediate first surface 93 and second surface 94. Dimension $d_1$ of spacer 91 directly affects the enhancement of appendage 90 upon the wireless communications of communication device 10. Dimension $d_1$ is one quarter the wavelength of the wireless communication signals in the described embodiment (i.e., approximately 3.2 inches for 915 MHz communications and about 1.2 inches for 2.45 GHz communications).

Referring to FIG. 6, appendage 90 is shown coupled or attached to communication device 10 to form a wireless communication package 11 in accordance with the present invention. Communication package 11 provides enhanced wireless communications compared with communications of device 10 alone. The wireless communication package 11 is configured as a wireless identification package in the described embodiment for communications with interrogator 14.

First surface 93 of spacer 91 is attached to the entire surface 29 of communication device 10 in the illustrated embodiment of communication package 11. Attachment of spacer 91 with communication device 10 is implemented by a spray adhesive in the described embodiment. Other attachment devices or methods are utilized in other embodiments of the invention. Preferably, adhesives are utilized which do not absorb or reflect radio frequency energy in the appropriate bands utilized for wireless communications within communication system 12.

Wireless communication signals (e.g., radio frequency signals) are reflected by conductive layer 92. Separating conductive layer 92 from communication device 10 by dimension $d_1$ adjusts the position of communication device 10 such that incident and reflected wireless communication signals add in phase at antennas 32, 34 of communication device 10. Utilization of appendage 90 with communication device 10 approximately doubles the electric field of the wireless communication signals.

Referring to FIG. 7, a front plan view of communication package 11 is shown. Conductive layer 92 and appendage 90 include an outer periphery 95 which defines the surface area of conductive layer 92. In a preferred embodiment of the invention, conductive layer 92 has an area greater than the respective areas of spacer 91 and first surface 27 of communication device 10. The illustrated spacer 91 provides a somewhat larger surface area than the surface area of surface 27 of communication device 10. Communication device 10, including antennas 32, 34, are received within the confines of periphery 95 of conductive layer 92 in the illustrated embodiment.

In addition to enhancing wireless communications of device 10, appendage 90 affects or controls the directivity of device 10. The directivity of communication device 10 is focused outward from surface 27 of device 10 at an angle normal to surface 27 in the described embodiment. Other configurations (not shown) of communication package 11 may be arranged to further alter the directivity of communication device 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless communication package comprising:
   a communication device comprising:
      a housing; and
      communication circuitry coupled with the housing and configured to communicate wireless signals; and
      an appendage comprising a conductive layer immovably affixed to and spaced from the housing and configured to enhance communication of the wireless signals using the communication circuitry.

2. The wireless communication package of claim 1 wherein the appendage is coupled with an entire surface of the housing.

3. The wireless communication package of claim 1 wherein the appendage is coupled with an external surface of the housing.

4. The wireless communication package of claim 1 wherein the appendage is coupled directly with the housing.

5. The wireless communication package of claim 1 wherein the appendage has an outer periphery greater than an outer periphery of a surface of the housing coupled with the communication device.

6. The wireless communication package of claim 1 wherein the appendage comprises:
 a ground plane; and
 a spacer intermediate the ground plane and the communication device.

7. The wireless communication package of claim 6 wherein the ground plane has an outer periphery greater than an outer periphery of the spacer.

8. The wireless communication package of claim 6 wherein the spacer spaces the ground plane from the communication device by a distance approximately equal to a quarter wavelength of the wireless signals.

9. The wireless communication package of claim 1 wherein the communication circuitry is configured to output and to receive wireless signals.

10. The wireless communication package of claim 1 wherein the communication device comprises a radio frequency identification device.

11. A wireless communication package comprising:
 a communication device comprising communication circuitry configured to communicate wireless signals; and
 an appendage coupled with an external surface of the communication device and configured to enhance communication of the wireless signals using the communication circuitry, wherein the appendage comprises a ground plane, and a spacer intermediate the ground plane and the communication device.

12. The wireless communication package of claim 11 wherein the appendage is coupled with an entire surface of the communication device.

13. The wireless communication package of claim 11 wherein the appendage has an outer periphery greater than an outer periphery of a surface of the communication device coupled with appendage.

14. The wireless communication package of claim 11 wherein the ground plane has an outer periphery greater than an outer periphery of the spacer.

15. The wireless communication package of claim 11 wherein the spacer spaces the ground plane from the communication device by a distance approximately equal to a quarter wavelength of the wireless signals.

16. The wireless communication package of claim 11 wherein the appendage is coupled directly to the external surface of the communication device.

17. The wireless communication package of claim 11 wherein the communication circuitry is configured to output and to receive wireless signals.

18. The wireless communication package of claim 11 wherein the communication device comprises a radio frequency identification device.

19. A radio frequency identification device communication package comprising:
 a radio frequency identification device comprising:
  a housing; and
  communication circuitry coupled with the housing and configured to communicate wireless identification signals responsive to reception of wireless interrogation signals; and
 an appendage coupled with the housing and configured to enhance communication of the wireless signals using the communication circuitry, wherein the appendage comprises a ground plane, and a spacer intermediate the ground plane and the housing.

20. An appendage configured to enhance wireless communications of an associated communication device, the appendage comprising:
 a layer configured to reflect radio frequency energy of a frequency band utilized by the associated communication device to implement wireless communications; and
 a spacer having a first surface coupled with the layer and a second surface adapted to be coupled with the associated communication device, the spacer being substantially transparent to radio frequency energy of the frequency band to pass the radio frequency energy of the frequency band without substantial absorption and without substantial reflection of the radio frequency energy of the frequency band.

21. The appendage of claim 20 wherein the first surface of the spacer is coupled directly with the layer.

22. The appendage of claim 20 wherein the second surface of the spacer is adapted to be coupled directly with the associated communication device.

23. The appendage of claim 20 wherein the layer comprises a ground plane.

24. The appendage of claim 20 wherein the layer has an outer periphery greater than an outer periphery of the spacer.

25. A method of communicating comprising:
 providing a wireless communication device configured to communicate wireless signals;
 coupling an appendage with the wireless communication device to form a wireless communication package, the appendage being configured to enhance communication of the wireless signals using the wireless communication device, and the appendage comprising a conductive layer immovably affixed to and spaced from the wireless communication device; and
 communicating wireless signals using the wireless communication package after the coupling.

26. The method of claim 25 wherein the providing comprises providing the wireless communication device including a housing and the coupling comprises coupling the appendage with an entire surface of the housing.

27. The method of claim 25 wherein the coupling comprises coupling the appendage with an external surface of the wireless communication device.

28. The method of claim 25 wherein the coupling comprises coupling the appendage comprising a ground Lane and a spacer.

29. The method of claim 25 wherein the communicating comprises outputting and receiving wireless signals.

30. The method of claim 25 wherein the providing comprises providing a radio frequency identification device.

31. A method of forming a wireless communication package comprising:
 providing wireless communication circuitry configured to communicate wireless signals;
 providing a housing configured to house at least a portion of the wireless communication circuitry;
 providing an appendage configured to enhance communication of the wireless signals using the wireless communication circuitry, the appendage comprising a ground plane and a spacer; and
 coupling the appendage with the housing.

32. The method of claim 31 wherein the coupling comprises coupling the appendage with an entire surface of the housing.

33. The method of claim 31 wherein the coupling comprises coupling the appendage with an external surface of the housing.

34. The method of claim 31 wherein the providing the appendage comprises providing the appendage including an outer periphery greater than an outer periphery of the external surface of the housing.

35. The method of claim 31 wherein the coupling comprises coupling the appendage directly with the housing.

36. The method of claim 31 wherein the providing wireless communication circuitry comprises providing radio frequency identification device communication circuitry.

37. A wireless communication package comprising:
  a communication device comprising:
    a housing; and
    communication circuitry coupled with the housing and configured to communicate wireless signals;
    an appendage coupled with the housing and configured to enhance communication of the wireless signals using the communication circuitry; and
    wherein the appendage is coupled with an entire surface of the housing.

38. A wireless communication package comprising:
  a communication device comprising:
    a housing; and
    communication circuitry coupled with the housing and configured to communicate wireless signals;
    an appendage coupled with the housing and configured to enhance communication of the wireless signals using the communication circuitry; and
    wherein the appendage has an outer periphery greater than an outer periphery of a surface of the housing coupled with the communication device.

39. A wireless communication package comprising:
  a communication device comprising:
    a housing; and
    communication circuitry coupled with the housing and configured to communicate wireless signals;
    an appendage coupled with the housing and configured to enhance communication of the wireless signals using the communication circuitry wherein the appendage comprises a ground plane, and a spacer intermediate the ground plane and the communication device.

40. The wireless communication package of claim 39 wherein the ground plane has an outer periphery greater than an outer periphery of the spacer.

41. The wireless communication package of claim 39 wherein the spacer spaces the ground plane from the communication device by a distance approximately equal to a quarter wavelength of the wireless signals.

42. A wireless communication package comprising:
  a communication device comprising communication circuitry configured to communicate wireless signals;
  an appendage coupled with an external surface of the communication device and configured to enhance communication of the wireless signals using the communication circuitry; and
  wherein the appendage is coupled with an entire surface of the communication device.

43. A wireless communication package comprising:
  a communication device comprising communication circuitry configured to communicate wireless signals;
  an appendage coupled with an external surface of the communication device and configured to enhance communication of the wireless signals using the communication circuitry; and
  wherein the appendage has an outer periphery greater than an outer periphery of a surface of the communication device coupled with appendage.

44. A method of communicating comprising:
  providing a wireless communication device comprising a housing and configured to communicate wireless signals;
  coupling an appendage with the wireless communication device to an entire surface of the housing to form a wireless communication package, the appendage being configured to enhance communication of the wireless signals using the wireless communication device; and
  communicating wireless signals using the wireless communication package after the coupling.

45. A method of communicating comprising:
  providing a wireless communication device configured to communicate wireless signals;
  coupling an appendage comprising a ground plane and a spacer with the wireless communication device to form a wireless communication package, the appendage being configured to enhance communication of the wireless signals using the wireless communication device; and
  communicating wireless signals using the wireless communication package after the coupling.

46. A method of forming a wireless communication package comprising:
  providing wireless communication circuitry configured to communicate wireless signals;
  providing a housing configured to house at least a portion of the wireless communication circuitry;
  providing an appendage configured to enhance communication of the wireless signals using the wireless communication circuitry; and
  coupling the appendage with an entire surface of the housing.

47. A method of forming a wireless communication package comprising:
  providing wireless communication circuitry configured to communicate wireless signals;
  providing a housing configured to house at least a portion of the wireless communication circuitry;
  providing an appendage configured to enhance communication of the wireless signals using the wireless communication circuitry; and
  coupling the appendage with an external surface of the housing, wherein the appendage includes an outer periphery greater than an outer periphery of the external surface of the housing.

* * * * *

UNITED STATES PATENT AND TRADEMARK OFFICE
CERTIFICATE OF CORRECTION

PATENT NO. : 6,333,693 B1
DATED : December 25, 2001
INVENTOR(S) : Freddie W. Smith Page 1 of 1

It is certified that error appears in the above-identified patent and that said Letters Patent is hereby corrected as shown below:

Column 1,
Line 65, replace "Enabling is communications" with -- Enabling communications --.

Column 3,
Line 63, replace "la comprises" with -- comprises --.
Line 23, replace "embodiments –are" with -- embodiments are --.

Column 7,
Line 26, repalce "2:45 GHz" with -- 2.45 GHz --.

Column 10,
Line 45, replace "ground Lane" with -- ground plane --.

Signed and Sealed this

Twenty-eighth Day of May, 2002

Attest:

JAMES E. ROGAN
Attesting Officer    Director of the United States Patent and Trademark Office